US008285076B2

(12) United States Patent
Panetta et al.

(10) Patent No.: US 8,285,076 B2
(45) Date of Patent: Oct. 9, 2012

(54) METHODS AND APPARATUS FOR VISUAL SUB-BAND DECOMPOSITION OF SIGNALS

(75) Inventors: Karen A. Panetta, Rockport, MA (US); Sos Agaian, San Antonio, TX (US)

(73) Assignee: The Trustees of Tufts College, Medford, MA (US)

( * ) Notice: Subject to any disclaimer, the term of this patent is extended or adjusted under 35 U.S.C. 154(b) by 801 days.

(21) Appl. No.: 12/411,716

(22) Filed: Mar. 26, 2009

(65) Prior Publication Data
US 2009/0245689 A1 Oct. 1, 2009

Related U.S. Application Data

(60) Provisional application No. 61/039,889, filed on Mar. 27, 2008.

(51) Int. Cl.
G06K 9/36 (2006.01)
G06K 9/40 (2006.01)
H04N 7/12 (2006.01)

(52) U.S. Cl. ............... 382/284; 382/254; 375/240.11

(58) Field of Classification Search ............... 382/162, 382/166, 173, 239, 284, 305, 312; 375/240.11, 375/240.19, 240.24; 345/582, 589, 617, 345/629; 348/222.1
See application file for complete search history.

(56) References Cited

U.S. PATENT DOCUMENTS

| | | | |
|---|---|---|---|
| 5,097,331 A * | 3/1992 | Chen et al. | ............... 375/240.11 |
| 5,414,782 A | 5/1995 | Carasso | |
| 5,623,558 A | 4/1997 | Billawala et al. | |
| 5,644,662 A | 7/1997 | Vuylsteke | |
| 5,771,318 A | 6/1998 | Fang et al. | |
| 5,796,874 A | 8/1998 | Woolfe et al. | |
| 6,128,344 A * | 10/2000 | Aono et al. | ............... 375/240.11 |
| 6,411,740 B1 * | 6/2002 | Daly | ............... 382/251 |
| 6,487,321 B1 | 11/2002 | Edgar et al. | |
| 6,636,645 B1 | 10/2003 | Yu et al. | |
| 6,792,162 B1 | 9/2004 | Edgar | |
| 6,879,735 B1 | 4/2005 | Portniaguine et al. | |
| 7,023,447 B2 * | 4/2006 | Luo et al. | ............... 345/582 |
| 7,181,084 B2 | 2/2007 | Jostschulte | |
| 7,430,329 B1 * | 9/2008 | Sarna | ............... 382/239 |
| 7,853,076 B2 * | 12/2010 | Le Meur et al. | ............... 382/166 |
| 7,961,790 B2 * | 6/2011 | Vitali et al. | ............... 375/240.24 |
| 2003/0086105 A1 | 5/2003 | Jostschulte | |
| 2005/0094845 A1 | 5/2005 | Lee et al. | |
| 2006/0010095 A1 | 1/2006 | Wolff et al. | |
| 2006/0067574 A1 | 3/2006 | Perlmutter et al. | |
| 2008/0144966 A1 | 6/2008 | Steinberg et al. | |

OTHER PUBLICATIONS

Notification of Transmittal of the International Search Report and the Written Opinion of the International Searching Authority, or the Declaration, PCT/US2009/039765 date of mailing Nov. 2, 2009, 4 pages.

(Continued)

*Primary Examiner* — Kanjibhai Patel
(74) *Attorney, Agent, or Firm* — Daly, Crowley, Mofford & Durkee, LLP

(57) ABSTRACT

Methods and apparatus for image processing include performing visual sub-band decomposition of an image using human visual system characteristics to generate a plurality of sub-band decomposed images, independently processing the plurality of sub-band decomposed images with at least one application, and fusing the independently processed sub-band decomposed images to reconstruct an output image.

19 Claims, 15 Drawing Sheets

OTHER PUBLICATIONS

Written Opinion of the International Searching Authority, PCT/US2009/039765 dated Nov. 2, 2009, 16 pages.

Greenblatt, A. et al: "Restoration of semi-transparent blotches in damaged texts, manuscripts, and images through localized, logarithmic image enhancement", Communications, Control and Signal Processing, 2008. ISCCSP 2008. 3$^{rd}$ International Symposium on, IEEE, Piscataway, NJ, USA, Mar. 12-14, 2008, pp. 484-489, XP031269118. ISBN: 978-1-4244-1687-5, 6 pages.

Greenblatt, A. et al: Restoration of images damaged by semi-transparent water blotches using localized image enhancement:, Proceedings of SPIE—The International Society for Optical Engineering—Mobile Multimedia/Image Processing, Security, and Applications 2008. 2008 SPIE US, vol. 6982, Mar. 19-Apr. 3, 2008. XP002551727, 10 pages.

Crawford, A.J. et al: "Multi-Scale Semi-Transparent Blotch Removal on Archived Photographs using Bayesian Matting Techniques and Visibility Laws", Image Processing, 2007. ICIP 2007. IEEE International Conference on, IEEE, PI, Sep. 1, 2007, pp. I-561, XP031157803. ISBN: 978-1-4244-1436-9, 4 pages.

Stanco, F. et al: "Virtual restoration of vintage photographic prints affected by foxing and water blotches", Journal of Electronic Imaging SPIE-Int. Soc. Opt. Eng USA, vol. 14, No. 4, Oct. 2005, pp. 43008-1, XP002551728. ISSN: 1017-9909, 10 pages.

Notification of transmittal of the International Preliminary Report on Patentability (Chapter 1 of the Patent Cooperation Treaty) dated Oct. 21, 2010, PCT/US2009/039765, 2 pages.

Written Opinion of the International Searching Authority, dated Oct. 21, 2010, PCT/US2009/039765, 14 pages.

U.S. Appl. No. 12/419,632, filed Apr. 7, 2009, 195 pages.

Notification of transmittal of the International Search Report, the International Search Report and the Written Opinion of the International Searching Authority dated Jul. 15, 2009, PCT/US2009/038350.

Written Opinion of the International Searching Authority, dated Jul. 15, 2009, PCT/US2009/038350.

Karen A. Panetta, Eric J. Wharton, Sos S. Agaian, Human Visual System-Based Image Enhancement and Logarithmic Contrast Measure, Feb. 1, 2008, vol. 38, No. 1, pp. 174-188.

M.K. Kunda, S.K. Pal, Thresholding for Edge Detection Using Human Psychovisual Phenomena, Dec. 1986, Pattern Recognition Letters 4, pp. 433-441.

Wen-Nung Lie, Li-Chun Chang, Data Hiding in Images With Adaptive Numbers of Least Significant Bits Based on the Human Visual System, Department of Electrical Engineering, National Chung Cheng University, 1999, IEEE, pp. 286-290.

John W. Wood, Jaemin Kim, Image Identification and Restoration in the Subband Domain, Rensselaer Polytechnic Institute, 1992, IEEE, pp. III-297-III-300.

Eric Wharton, Sos Agaian, Karen Panetta, A Logarithmic Measure of Image Enhancement, Proc. of SPIE, vol. 6250, 2006, pp. 1-12.

Notification Concerning Transmittal of International Preliminary Report on Patentability (Chapter 1 of the Patent Cooperation Treaty), PCT/US2009/038350, Date of mailing Oct. 7, 2010, 2 pages.

Written Opinion of the International Searching Authority, PCT/US2009/038350, Date of mailing Oct. 7, 2010, 8 pages.

\* cited by examiner

Original

Devries-Rose Region

Weber Region

Saturation Region
+ 4th Region

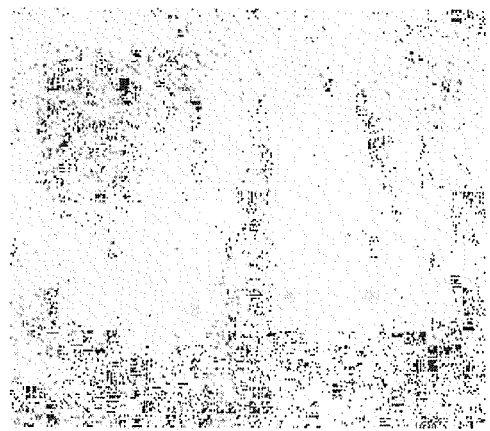
4th Region (Low Contrast)
Devries-Rose Region
FIG. 3E
FIG. 3F
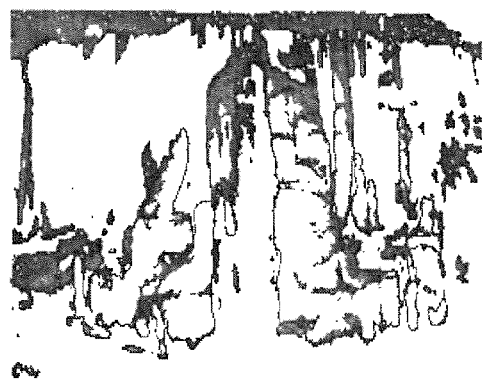
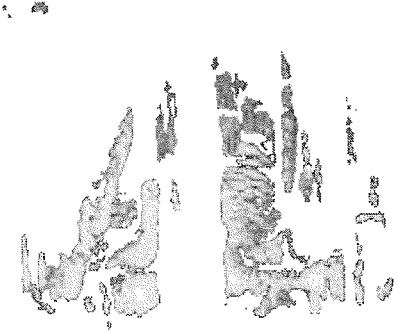
Weber Region
Saturation Region
FIG. 3G
FIG. 3H

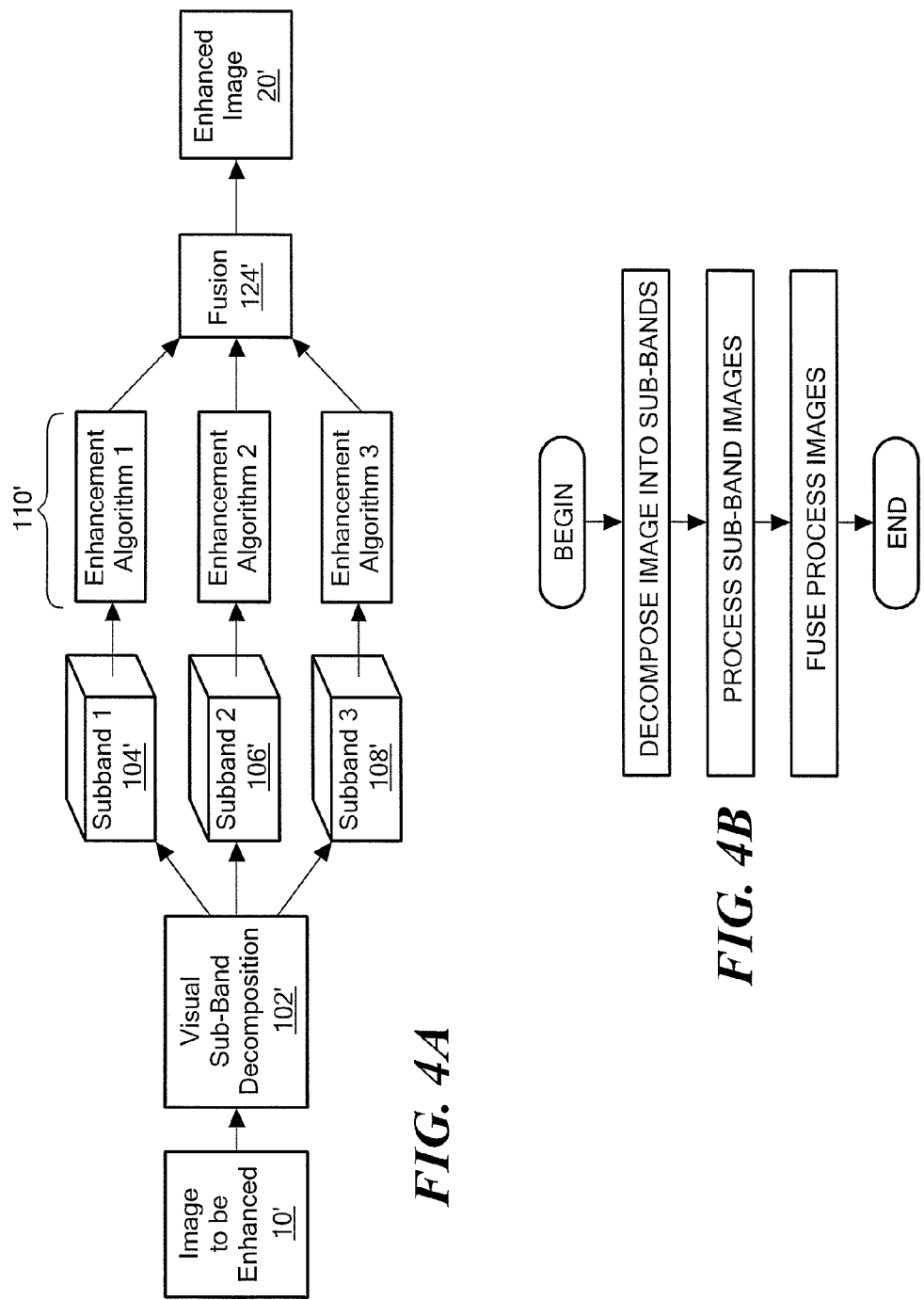

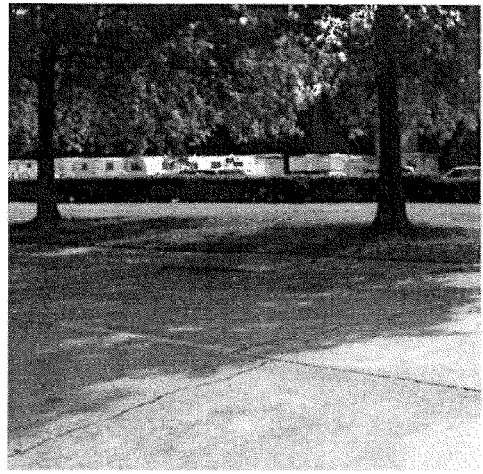
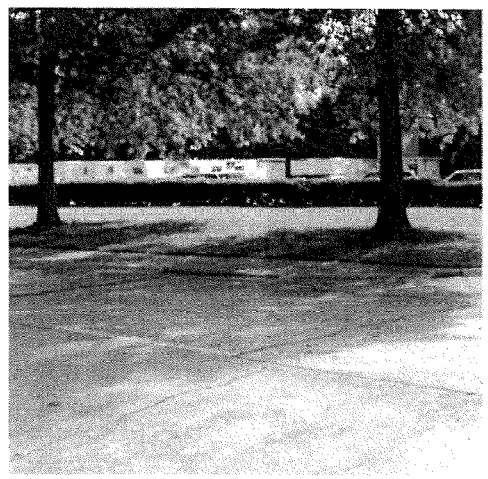
*FIG. 6A*  *FIG. 6B*
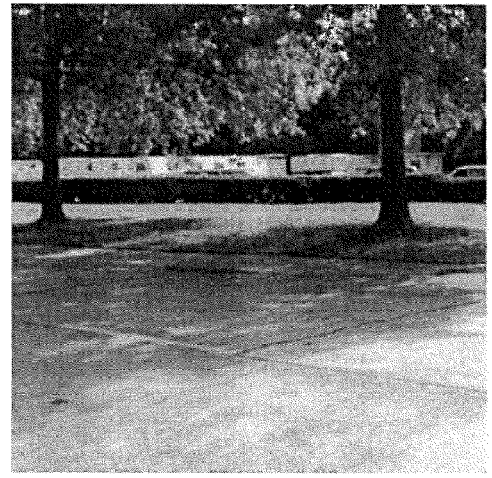
*FIG. 6C*

METHODS AND APPARATUS FOR VISUAL SUB-BAND DECOMPOSITION OF SIGNALS

CROSS-REFERENCE TO RELATED APPLICATIONS

The present application claims the benefit of U.S. Provisional Patent Application No. 61/039,889, filed on Mar. 27, 2008, which is incorporated herein by reference.

SUMMARY

The present invention provides methods and apparatus for visual sub-band decomposition of an image signal (S) by imitating and using Human Visual System Characteristics (HVSC). A base image (S) is used as an input and generates sub band decomposed images ($S_{bi}$, i=1, 2 . . . M) that may include variable level sub-band decomposition. The resulting sequence of sets of sub images may be processing independently and may be transmitted, analyzing and displaying separately. The sub-band decomposed images can be stored and retrieved to be applied to any number of different processing cycles and incorporate with other decomposition methods. The decomposed images may then be fused back together to reconstruct an output image (S').

Another aspect of the present invention is that the resulting sets of sub images can be used/incorporated as input to a variety of image processing techniques such as, enhancement, edge detection, filtering, compression, recognition, denoising, restoration, digital forensic, security, and information hiding. It is understood that exemplary embodiments of the invention are useful in a wide variety of applications including photography, video, medical imaging, and digital film processing, whereby the illustrated method may be used to improve image contrast. Embodiments of the invention can process the images in real time and can operate in a wire and/or wireless transmission environment or embedded in a hardware, firmware, or software which is embedded in another system or application.

In one aspect of the invention, a computer-implemented method comprises performing visual sub-band decomposition of an image using human visual system characteristics to generate a plurality of sub-band decomposed images, independently processing the plurality of sub-band decomposed images with at least one application on a computer, and fusing the independently processed sub-band decomposed images to reconstruct an output image.

The method can include one of more of the following features: the plurality of sub-band decomposed images include variable level sub-band decomposition, the application includes image enhancement and/or edge detection, performing decomposition of the image not including human visual system characteristics for inclusion in the fusing step, fusing is performed to optimize a particular application, transmitting, analyzing and displaying the sub-band decomposed images separately, and performing on the image one of more of edge detection, compression, filtering, enhancement, edge enhancement, edge detection, filtering, compression, recognition, denoising, restoration, digital forensic, security, and information hiding, recognition, fault detection, static hazard free circuit design, a method for simplifying a plurality of gates in circuits, image interpolation and image resizing.

In another aspect of the invention, an article comprises a machine-readable medium that stores executable instructions to enable a computer perform the steps of: performing visual sub-band decomposition of an image using human visual system characteristics to generate a plurality of sub-band decomposed images, independently processing the plurality of sub-band decomposed images with at least one application on a computer, and fusing the independently processed sub-band decomposed images to reconstruct an output image.

In a further aspect of the invention, a system comprises: a first decomposition module to decompose an image into a first sub-band based on human visual system characteristics, a second decomposition module to decompose the image into a second sub-band based on human visual system characteristics, a third decomposition module to decompose the image into a third sub-band based on human visual system characteristics, a processing module to process the decomposed images from the first, second, and third sub-band modules, and a fusion module to fuse the processed decomposed images from the processing module.

The system can further include one or more of the following features: the plurality of sub-band decomposed images include variable level sub-band decomposition, the application includes image enhancement and/or edge detection, decomposition of the image not including human visual system characteristics for inclusion in the fusing step, and fusing is performed to optimize a particular application.

BRIEF DESCRIPTION OF THE DRAWINGS

The foregoing features of this invention, as well as the invention itself, may be more fully understood from the following description of the drawings in which:

FIGS. 3A-3H show images processed in accordance with exemplary embodiments of the present invention;

FIG. 4A is a block diagram of a further exemplary image processing system in accordance with exemplary embodiments of the invention;

FIG. 4B is a flow diagram showing an exemplary sequence of steps for image processing in accordance with exemplary embodiments of the invention;

DETAILED DESCRIPTION

Figure 1:
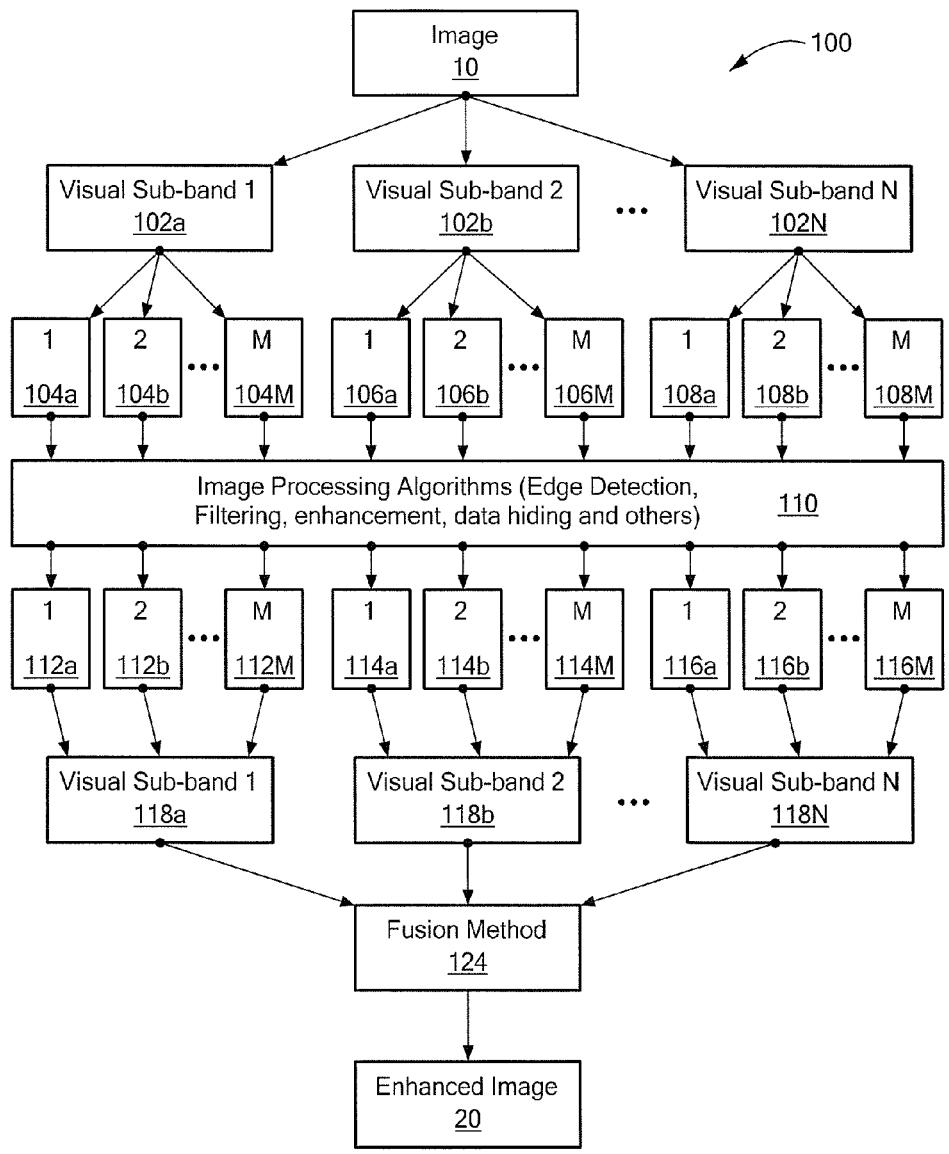
FIG. 1 is a block diagram of an exemplary image processing system in accordance with exemplary embodiments of the invention.

FIG. 1 shows an exemplary top level image processing system 100 in accordance with exemplary embodiments of the invention. A first visual sub-band module 102a, a second visual sub-band module 102b, and a further visual sub-band module 102M each decompose an image 10 into respective sub-bands, as described more fully below. In an exemplary embodiment, the image is decomposed into sub-bands that model the human visual system.

The visual sub-band modules 102 provide respective decomposed images 104a-M, 106a-M, 108a-M to an image processing module 110. The image processing module 110 can provide various processing depending upon the selected application. Exemplary processing includes edge detection, filtering, data hiding, etc. The image processing module 110 outputs processed images 112a-M, 114a-M, 116a-M for the sub-bands that can be stored by a first visual sub-band output module 118a, a second visual sub-band output module 118b, and a further visual sub-band output module 118M. The processed images for the sub-bands are then fused by a fusion module 124 to generate an enhanced image 20.

In general, the process of decomposing images into multiple sub-bands allows improved local enhancement for each sub-band, as opposed to utilizing a single method, which may not work well for certain areas of the image. For example, dark areas and bright areas of a photo may benefit from different processing. Depending on the choice of the sub-bands and fusion method, one can achieve a fast efficient hardware implementation or software system for imaging applications. This allows imaging systems to run faster and provides low-cost implementation choices. This enables the use of imaging hardware in applications that are currently cost prohibitive due to the implementation complexity. As an example, an exemplary embodiment of the invention can be directed to low-cost cameras for applications where the cameras will not or cannot be retrieved. The cameras should be sufficiently inexpensive so that they can be discarded, yet efficient enough to provide accurate crucial information quickly. Conventional computational methods for detection are not cost-effective and are impractical.

Exemplary embodiments of the invention can process images in real time on-the-fly or in a batch mode, and can operate in a wire and/or wireless transmission environment or embedded in a hardware, firmware, or software which is embedded in another system or application. The system can be a stand-alone system or a server/client network system, etc.

There are a number of known models of the human visual system have been introduced for various applications. One known method is to attempt to model the transfer functions of the parts of the human visual system, such as the optical nerve, cortex, etc. This method then attempts to implement filters which recreate these processes to model human vision. Another known method uses a single channel to model the entire system, processing the image with a global algorithm. Another known method uses knowledge of the human visual system to detect edges using a collection of known one-dimensional curves. Along with the gradient information along those curves, there is a complete representation of the image.

In exemplary embodiments of the invention, an image is segmented into a collection of two-dimensional images with similar internal properties. To perform the two-dimensional segmentation gradient information is used in conjunction with background illumination.

Figure 2:
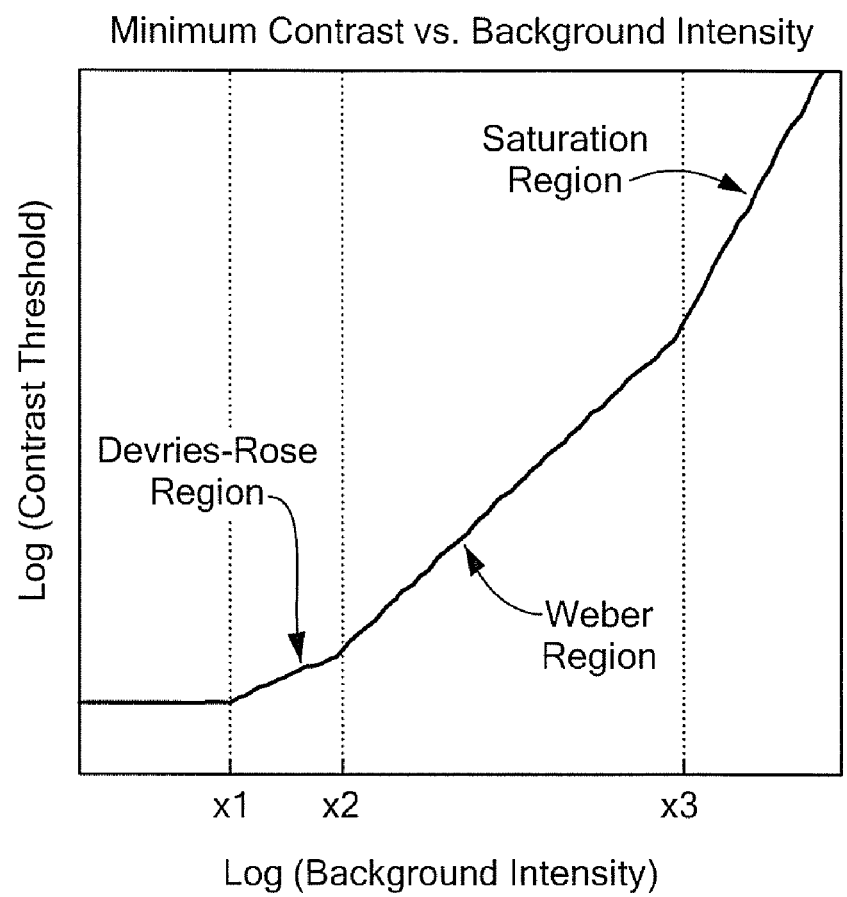
FIG. 2 is a graphical representation of the four regions of human visual response, Devries-Rose from $x_1$ to $x_2$, Weber from $x_2$ to $x_3$, Saturation from $x_3$ to infinity, and the fourth region less than $x_1$, containing the least informative pixels
Figure 3A:
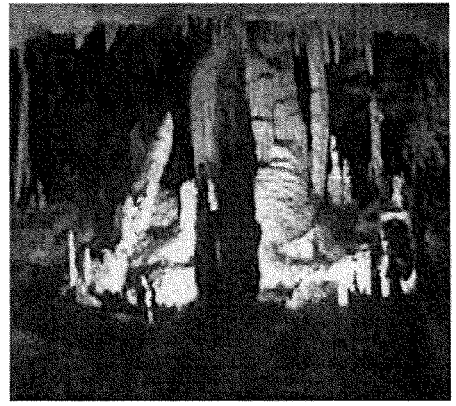
Figure 3B:
Figure 3C:
Figure 3D:

As shown in FIG. 2, there are four regions of human visual response known as Devries-Rose region, for under-illuminated areas; the Weber region, for properly-illuminated areas; and the saturation region, which approximates the threshold for over-illuminated areas. Note that, the Weber's Contrast Law quantifies the minimum change required for the human visual system to perceive contrast, however this only holds for a properly illuminated area. The minimum change required is a function of background illumination, and can be closely approximated with three regions or two regions. The first is the Devries-Rose region, which approximates this threshold for under-illuminated areas. The second, and most well known, region is the Weber region, which models this threshold for properly-illuminated areas. Finally, there is the saturation region, which approximates the threshold for over-illuminated areas. Similar visual sub-image decomposition can be done by using statistical, other human visual models, or other methods.

This model enables an automated method for decomposing an image into four, three, and two regions/subbands. These different regions are characterized by the minimum difference between two pixel intensities for the human visual system to register a difference. The parameters x1, x2, and x3 can be calculated using deferens methods in a manner known in the art. Particularly, the four visual sub-band images can be calculated as described below in detail:

$Subband\ 1 = X(x, y)$ $\qquad B_{x2} \geq B(x, y) \geq B_{x1}\ \&\ \dfrac{X'(x, y)}{\sqrt{B(x, y)}} \geq K_2$ $Subband\ 2 = X(x, y)$ such that $B_{x3} \geq B(x, y) \geq B_{x2}\ \&\ \dfrac{X'(x, y)}{B(x, y)} \geq K_1$ $Subband\ 3 = X(x, y)$ $\qquad B(x, y) > B_{x3}\ \&\ \dfrac{X'(x, y)}{B(x, y)^2} \geq K_3$ $Subband\ 4 = X(x, y)$ $\qquad$ All Remaining Pixels where B(x, y) is the background intensity at each pixel, X(x, y) is the input image, Q is all of the pixels which are directly up, down, left, and right from the pixel, Q' is all of the pixels diagonally one pixel away, and l and q are some constant:

$$B(x, y) = l \otimes \left[ l \otimes \left( \dfrac{l}{2} \otimes \sum_Q X(i, j) \oplus \dfrac{q}{2} \otimes \sum_{Q'} X(k, l) \right) \oplus X(x, y) \right]$$

where $\oplus$ as PLIP addition, $\ominus$ as PLIP difference and $\otimes$ as PLIP multiplication by a scalar, as set below in PLIP Arithmetic and disclosed in "Human Visual System-Based Image Enhancement and Logarithmic Contrast Measure Panetta, K. A., Wharton, E. J., and Agaian, S. S., Tufts Univ., Medford; *Systems, Man, and Cybernetics, Part B: Cybernetics, IEEE Transactions on*, Publication Date: February 2008, Volume: 38, Issue: 1, page(s): 174-188.

The thresholding parameters $B_{xi}$, i=1, 2, 3 are calculated by for the background illumination thresholds and $K_i$, i=1, 2, 3 for the gradient thresholds.

$$B_{x1} = \alpha_1 B_T \quad (2)$$
$$B_{x2} = \alpha_2 B_T$$
$$B_{x3} = \alpha_3 B_T$$

$$K_1 = \frac{1}{100}\beta \cdot \max\left(\frac{X'(x, y)}{B(x, y)}\right) \quad (3)$$
$$K_2 = K_1 \sqrt{B_{x2}}$$
$$K_3 = K_1 / B_{x3}$$

where $\alpha_1, \alpha_2, \alpha_3$ are parameters based upon the three different regions of response characteristics displayed by the human eye. As $\alpha_1$ is the lower saturation level, it is effective to set this to 0. For $\alpha_2, \alpha_3$, it is necessary to determine these experimentally, or rule/measure.

In some cases it is effective to combine the saturation region and the fourth image. Experimental results show that this does not produce noticeable changes in the output image and has the benefit of reducing computation time and simplifying the process. This is demonstrated in FIGS. 3 and 4A showing the use of the four regions and the simplified three region method, which are effectively the same. These three segmented images are obtained using the following formula:

$$\text{Subband } 1 = X(x, y) \quad\quad B_{x2} \geq B(x, y) \geq B_{x1} \ \& \ \frac{X'(x, y)}{\sqrt{B(x, y)}} \geq K_2$$

$$\text{Subband } 2 = X(x, y) \text{ such that } \quad B_{x3} \geq B(x, y) B_{x2} \ \& \ \frac{X'(x, y)}{B(x, y)} \geq K_1$$

$$\text{Subband } 3 = X(x, y) \quad\quad \text{All Remaining Pixels}$$

These three images are then enhanced separately and recombined to form the enhanced image. FIG. 3 shows the effects of merging the saturation region and low contrast region. FIG. 3 demonstrates the HVS based Image Enhancement model using 3 subbands versus 4 subbands; the original image (a) is segmented into three sub-images (b-d), combining the Low Contrast $4^{th}$ Region with the Saturation Region for simplicity, (e-f) is the method using all 4 regions, (g) is the Weber region, and (h) is the saturation region.

FIG. 4B is a flow diagram showing an exemplary sequence of steps for implementing visual sub-band decomposition based image enhancement in accordance with exemplary embodiments of the present invention. In step 400, an image is split into N (N=2, 3, 4, or other) visual subband-images, or segments. In step 402, each image is enhanced separately using different or similar image enhancement algorithms. In step 404, the N enhanced visual subband images are recombined/fused to form the enhanced image.

FIG. 5 shows an exemplary visual sub-band decomposition based so-called multi-histogram equalization image enhancement process. Conventional image enhancement methods include contrast stretching and histogram modeling. Histogram equalization is a specific case of histogram modeling in which a uniform distribution is forced on an input image. Histogram equalization has been used to correct for uniform brightness issues, however it also has issues such as changing the overall brightness of an image and adding artifacts. To address this, histogram equalization has been modified to bi-histogram equalization, which splits an image into two segments based on a threshold and equalizes the two separately. This is done to maintain the original brightness of the image and reduce artifacts while producing a more visually appealing image. Many methods have been proposed to select this threshold and the extension to generalized histogram modeling and multi-histogram equalization. Dualistic Sub-image Histogram Equalization (DSHE) selects the threshold to have an equal number of pixels both above and below the threshold, in an attempt to maximize entropy. Histogram modeling attempts to force a desired histogram on an image instead of converting to a flat histogram. These are global algorithms, meaning that they apply the same transform to every pixel in the image in the same way, regardless of local image information. However, in many cases it is beneficial to adapt the enhancement within differing regions of the image. The inventive Human Visual System based image processing can be used for edge detection, by keeping the gradient information for only the pixels in the first three segmented regions.

In multi-histogram equalization image enhancement algorithm, the decomposition process 102 of FIG. 4 is modified by using histogram equalization blocks 110 for enhancement. This allows for more adaptable image enhancement which is better able to address local features of an image using less complex global algorithms. The computer simulations have shown the better performance and more consistent results.

Figure 5A:
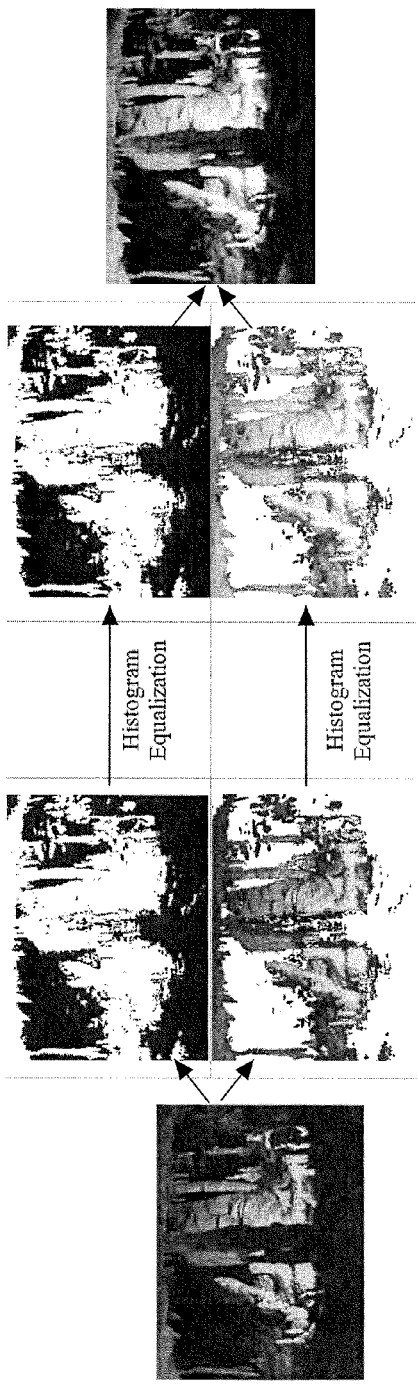
FIGS. 5A-5B show shows images processing using prior art techniques.

FIG. 5 demonstrates two basic multi-histogram equalization approaches; Dualistic Sub-image Histogram Equalization (DSHE) using two sub-images and Recursive Mean-Separate Histogram Equalization (RMSHE) using four sub-images. DSHE in FIG. 5a shows the thresholding step and the result of the separate equalizations. While this thresholding method achieves better results than standard histogram equalization, it can be improved. The threshold value used for FIG. 5 results in an image containing only the darkest parts of the image, and another image which contains a visually pleasing portion as well as an over-illuminated portion. Additionally, the regions do not always correspond to the physical regions present. This causes the unnatural appearance which is common to histogram equalization methods.

Figure 5B:
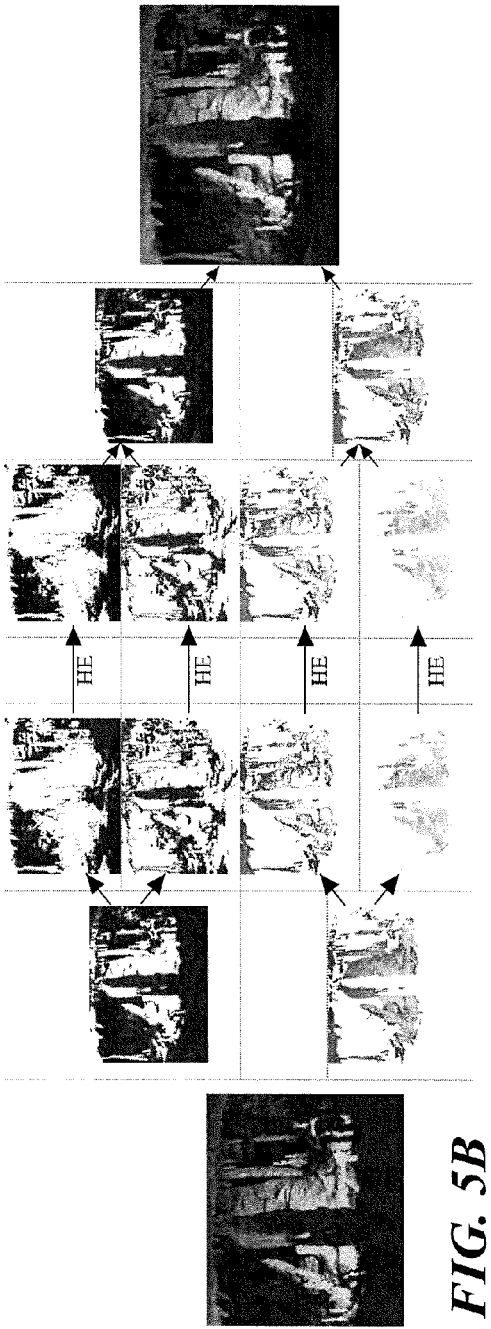

FIG. 5b shows RMSHE using four sub-images. It can be seen that this improves brightness preservation and produces a more visually natural image than DSHE, however the segmented regions still do not always correspond to the actual physical regions because the thresholding is performed directly on the pixel intensities.

Figure 6D:
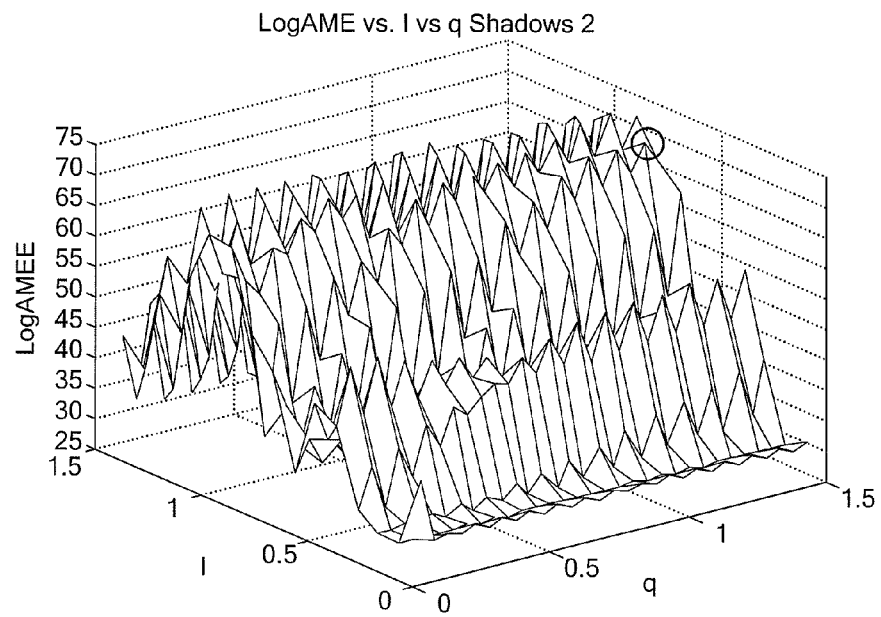
FIG. 6 shows images processed using the Logarithmic AMEE contrast measure to select l and q, (a) Original image, (b) Enhanced with global histogram equalization, (c) Enhanced with HVS based multi-histogram equalization, (d) Logarithmic AMEE graph used to select parameters, the values are taken from the absolute maximum, occurring at l=0.9, q=1.4 (circled)
Figure 7A:
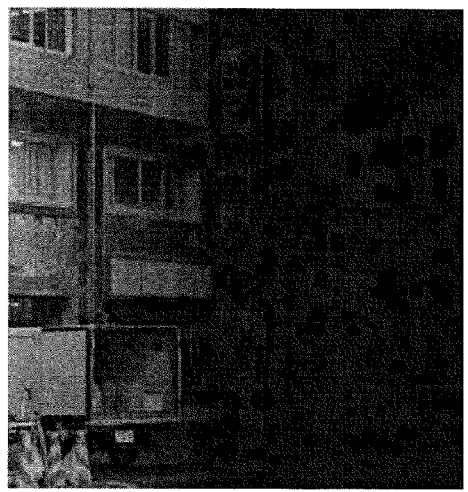
FIG. 7 shows images processed using the Logarithmic AMEE contrast measure to select $\alpha_2$ and $\alpha_3$, (a) Original image, (b) Enhanced with global histogram equalization, (c) Enhanced with HVS based multi-histogram equalization, (d) Logarithmic AMEE graph used to select parameters, the values are taken from the largest local maxima, occurring at $\alpha_2$=0.12 and $\alpha_3$=0.63 (circled)
Figure 7B:
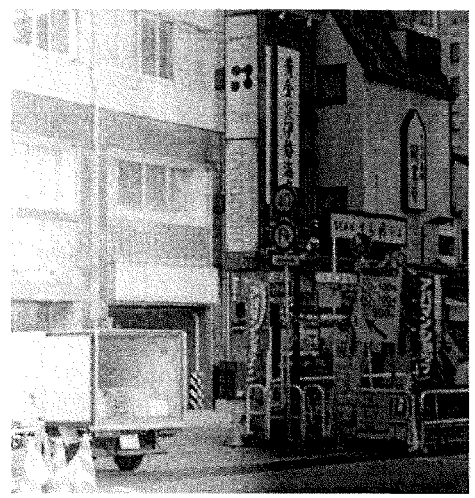
Figure 7C:
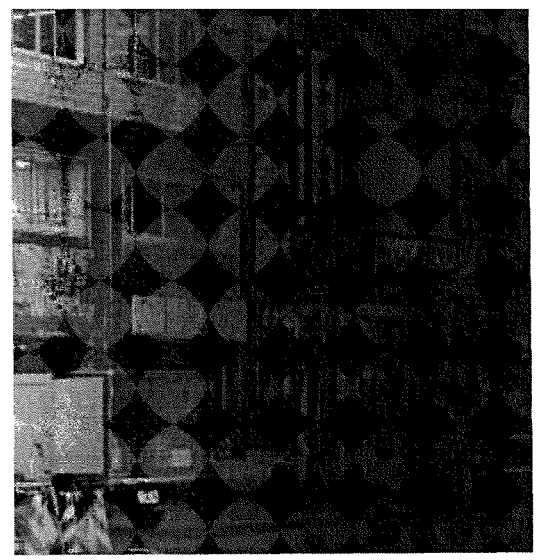
Figure 7D:
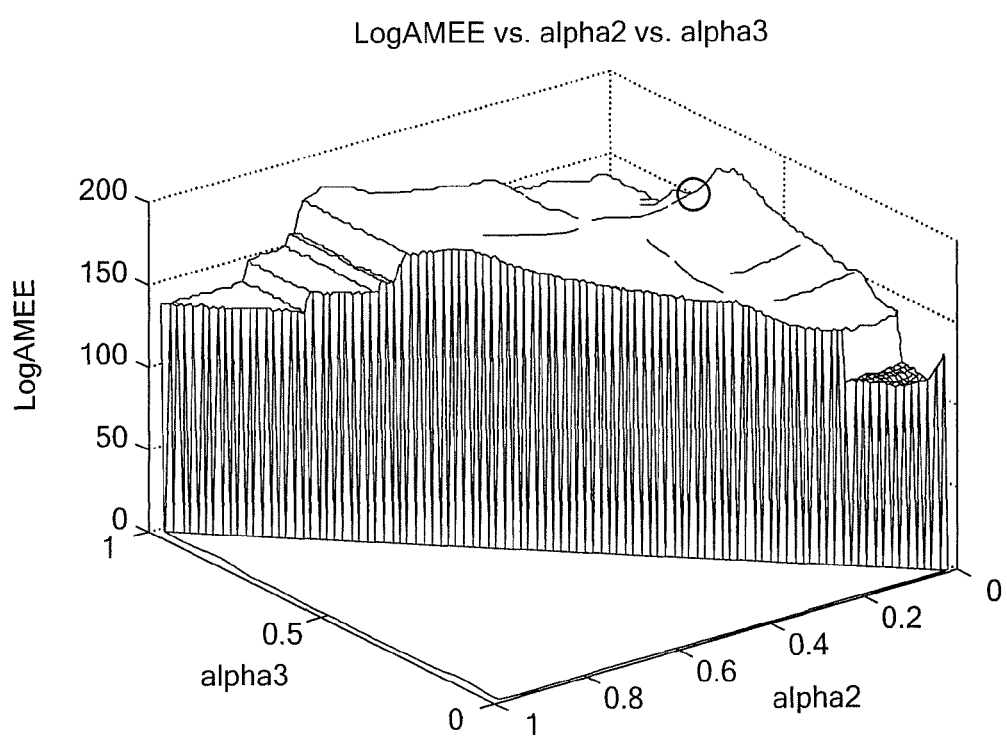
Figure 8A:
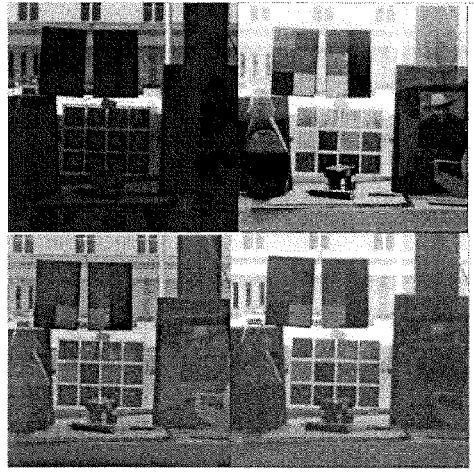
FIGS. 8A-8L show processed images for HVS vs. Retinex Results for all images; top left is original image, top right is histogram equalization, bottom left is Retinex, bottom right is HVS based image enhancement.
Figure 8B:
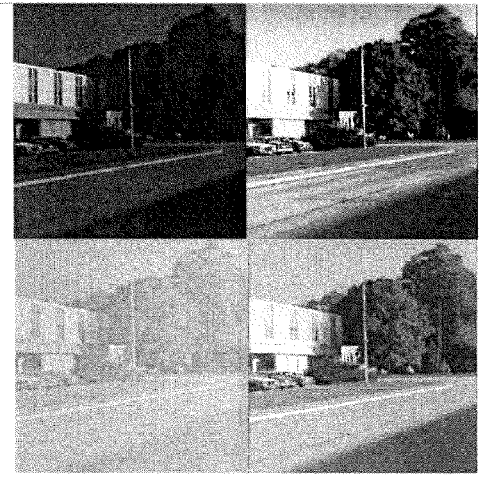
Figure 8C:
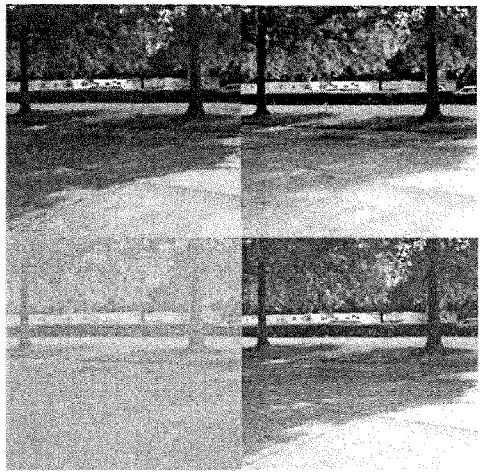
Figure 8D:
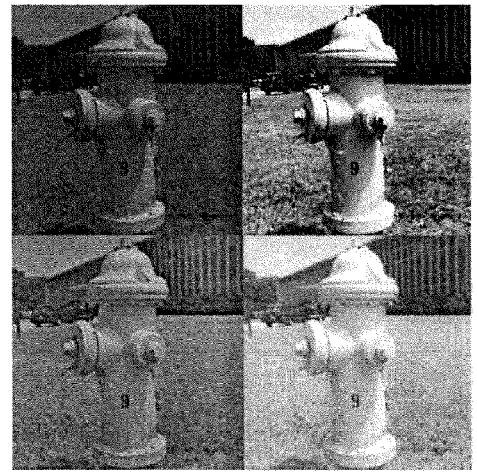
Figure 8E:
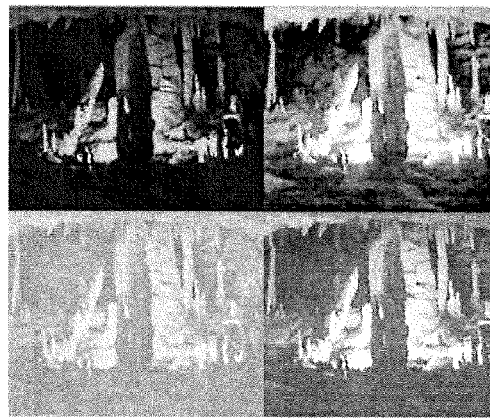
Figure 8F:
Figure 8G:
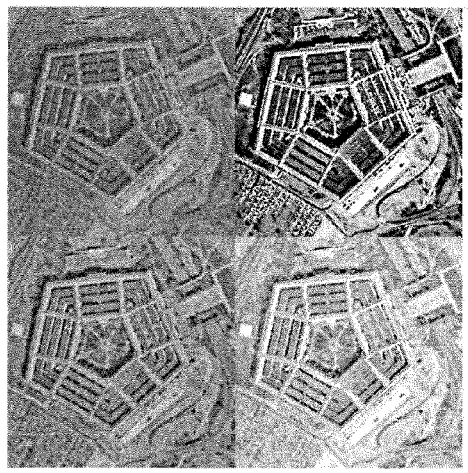
Figure 8H:
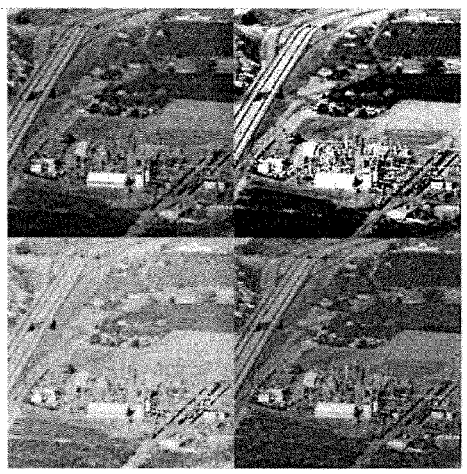
Figure 8I:
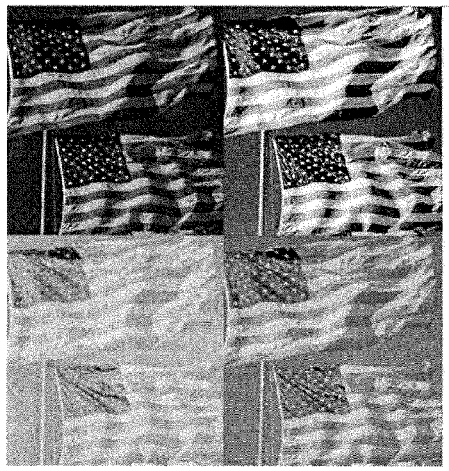
Figure 8J:
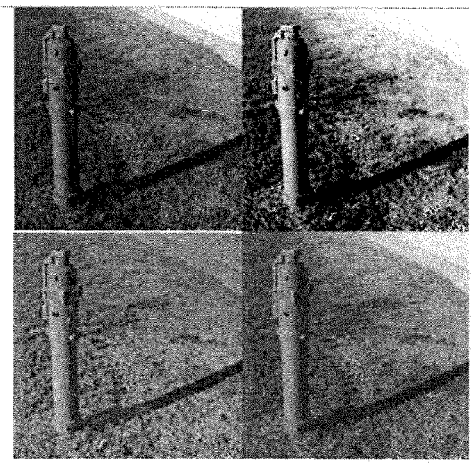
Figure 8K:
Figure 8L:
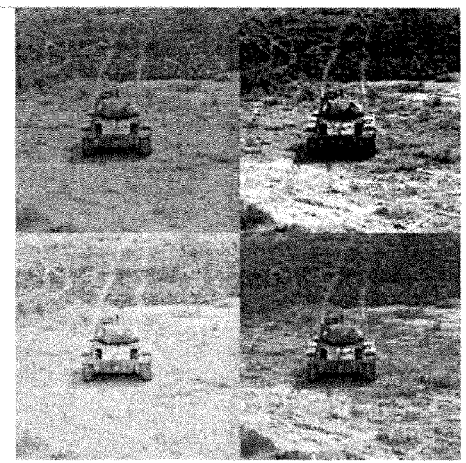

In accordance with exemplary embodiments of the invention, the parameter selection can be done by using the Logarithmic AMEE measure or other measure as described below in Contrast Measure. FIGS. 6a,b show the original shadow image and the image processed with global histogram equalization. FIG. 6c shows the output of HVS based multi-histogram equalization, and FIG. 6d shows the graph used to select l and q. The graph in FIG. 6d shows a number of local extrema, with ridges moving diagonally through the graph. The absolute maximum occurs at l=0.9, q=1.4, which is circled. A number of the local extrema were tested, and it was found that the values resulting in the absolute maximum are the best. The resulting image using this combination is shown in FIG. 6c. As can be seen comparing the result of global histogram equalization and HVS based multi-histogram equalization, the image using the global algorithm (FIG. 6b) loses information from the brightest portions of the original image, such as the trailers in the background and the sidewalk. These are driven to saturation at value 255. The image in FIG. 6c, however, maintains the details in these areas while giving a more visually pleasing output image.

Selection of the $\alpha$ constants, while slightly different for different images, is efficiently done using the Logarithmic AMEE measure, as demonstrated in FIG. 7. FIGS. 7a,b show the original image and the image processed with global histogram equalization. FIG. 7c shows the output of HVS based multi-histogram equalization. FIG. 7d shows the graph used to select $\alpha_2$ and $\alpha_3$. The graph in FIG. 7d shows a number of "ridges" along constant values of $\alpha_2$ and $\alpha_3$. Selection of these parameters is then achieved by locating the intersection between these ridges in an acceptable place. As several of the ridges would intersect in places where $\alpha_3<\alpha_2$, this greatly reduces the number of false positives. The answer then lies at the most prominent local maximum, in this case $\alpha_2=0.12$ and $\alpha_3=0.63$, which is circled. These are the parameters used for the image in FIG. 7c. This image does not lose any of the information from the illuminated side of the image, as is the case with global histogram equalization.

The following example presents an exemplary enhancement process used in conjunction with Human Visual System Based Image Enhancement. An Edge Preserving Contrast Enhancement (EPCE) process is disclosed. It is well known that human eyes have a much larger dynamic range than current imaging and display devices. Traditional methods for image enhancement such as gamma adjustment, logarithmic compression, histogram equalization, and level or curve type methods are generally limited because they process images globally. To solve this, more advanced methods have been introduced based on better understanding of the human visual system which is more capable of handling scenes with high dynamic ranges. Many of these methods make use of spatially dependent processing methods where each pixel is determined by both local and global image information.

The inventive Edge Preserving Contrast Enhancement (EPCE) process is a contrast enhancement algorithm which is designed to preserve edges while improving contrast on a local scale by combining the output of an edge detection algorithm with the original spatial image information. This achieves a more robust enhancement algorithm that is tunable to perform edge detection or enhancement. This enhancement process can work with any suitable edge detection algorithm. It uses pre-processing steps to standardize image brightness and several post-processing steps to enhance the edges.

The inventive measure shows the results of computer simulations with the presented image enhancement algorithms. Results are compared to the known Retinex algorithm and histogram equalization, since these are comparable fully automated image enhancement algorithms. For the basis of comparison, the Logarithmic AME is used to assess the enhancement quality. FIG. 8 shows HVS vs. Retinex Results for images; for each of FIG. 8a-l, top left is original image, top right is histogram equalization, bottom left is Retinex, bottom right is HVS based image enhancement.

In one aspect of the invention, edge detection can be used for processing the sub-band images. Edge detection can include, for example, conventional, conventional with PLIP Arithmetic and different shapes (see, e.g., Shahan Nercessian, Karen Panetta, and Sos Agaian, "Generalized Rectangular Edge Detection Kernels and Edge Fusion For Biomedical Applications," in Biomedical Imaging: From Nano to Macro, 2009. ISBI 2009. 6th IEEE International Symposium on, 2009, Shahan Nercessian, Karen Panetta, and Sos Agaian, "A Generalized Set of Kernels for Edge and Line Detection," in SPIE Electronic Imaging 2009, San Jose, Calif., USA, 2009). It is understood that in scene analysis systems the use of edge detection to determine the boundary between foreground and background objects is important. From military and robotics to security and data hiding/watermarking, the accurate detection of edges allows improved object recognition and image attribute identification. To do so, the balance between good detection and reducing the amount of errors (false positives) is essential, although often a difficult task as unwanted noise is frequently emphasized by derivative-based techniques.

Referring again to FIG. 4A, visual sub-band decomposition 102 is performed and the enhancement application 110 is an edge detection procedure: First, the image is split into N (N=2, 3, 4, or other) visual sub band images 104. Next, each image is applied separately using different or similar image edge detection algorithms 110. Finally, the N enhanced visual subband-images are recombined/fused 124 to form the edge maps.

The decomposed images may then be fused back together to reconstruct an output image. In exemplary embodiments, a particular fusion procedure can be selected based upon certain criteia. For example, given two visual sub images $I_1$ and $I_2$ can be fused by using the following procedures $$A_1 = I_1 * \begin{bmatrix} 1 & 1 & 1 \\ 1 & 0 & 1 \\ 1 & 1 & 1 \end{bmatrix},$$

$$A_2 = I_2 * \begin{bmatrix} 1 & 1 & 1 \\ 1 & 0 & 1 \\ 1 & 1 & 1 \end{bmatrix}$$

where * denotes PLIP convolution $A = A_1 \oplus A_2;\ d_1 = I_1 \ominus A_1;\ d_2 = I_2 \ominus A_2;$ $D = \max(\mathrm{abs}(d_1), \mathrm{abs}(d_2))$ $\mathrm{Edge\_Map} = (\alpha \otimes A) \oplus (\beta \otimes D)$ where $\alpha$, and $\beta$ are some parameters, and where $\oplus$ as PLIP addition, $\ominus$ as PLIP difference and $\otimes$ as PLIP multiplication by a scalar. Or, where $\oplus$, $\ominus$ and $\otimes$ can be commonly used operations: $\oplus$ addition, $\ominus$ difference, and $\otimes$ multiplication by a scalar.

Figure 9A:
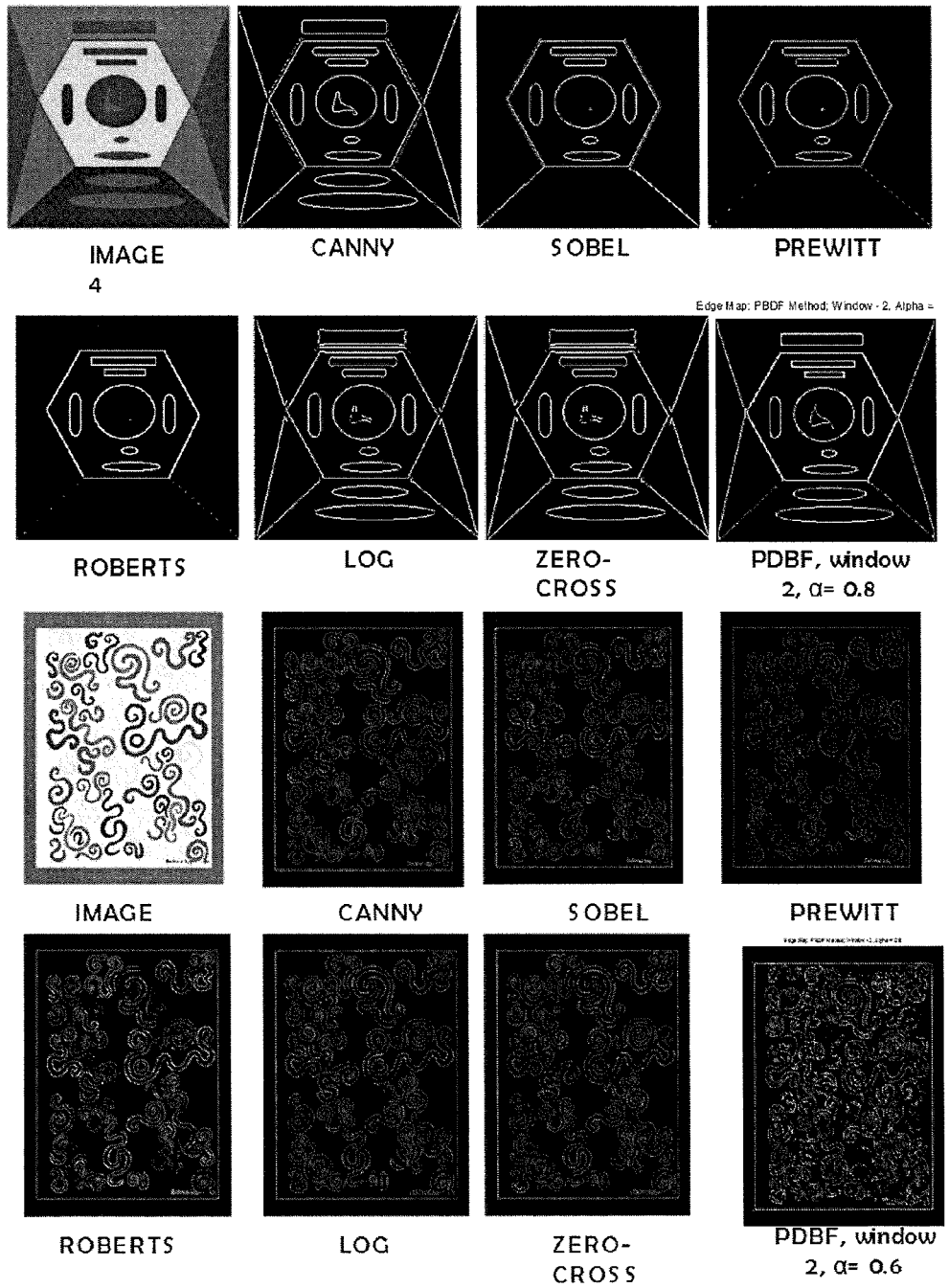
FIGS. 9A-C show images processed using: first column—original image; second column—HVS based edge detector; third column—Gaussian edge detector; fourth column—Canny edge detector.
Figure 9B:
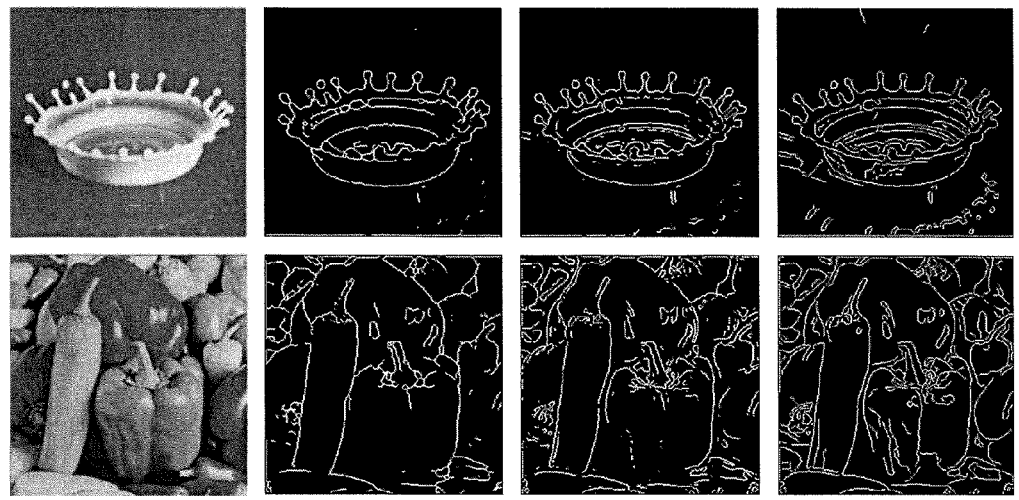
Figure 9C:
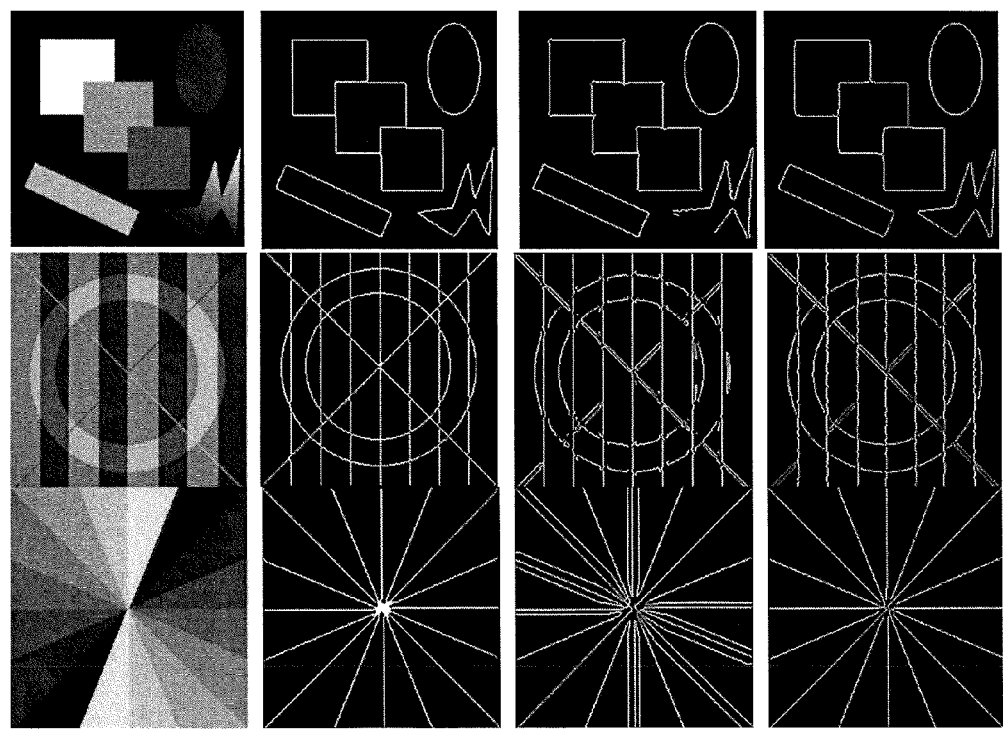

Using visual sub-band composition with edge detection quantitatively outperforms conventional edge detection as shown in FIGS. 9A-9C, where First column—Original Synthetic Images; b) second column—HVS Based Edge Detector; c) 3rd column—Gaussian Edge Detector; and d) 3rd column—Canny Edge Detector Parameterized Logarithmic Image Processing (PLIP) Arithmetic The PLIP model was introduced by Panetta, Wharton, and Agaian to provide a non-linear framework for image processing that addresses these five requirements. It is designed to both maintain the pixel values inside the range (0, M] as well as to more accurately process images from a human visual system point of view. To accomplish this, images are processed as absorption filters using the gray tone function. This gray tone function is as follows:

$$g(i,j) = M - f(i,j) \tag{1}$$

where $f(i, j)$ is the original image function, $g(i, j)$ is the output gray tone function, and M is the maximum value of the range. It can be seen that this gray tone function is much like a photo negative. The PLIP model operator primitives can be summarized as follows:

$$a \oplus b = a + b - \frac{ab}{\gamma(M)} \tag{2}$$

$$a \ominus b = k(M) \frac{a - b}{k(M) - g} \tag{3}$$

$$c \otimes a = \gamma(M) - \gamma(M)\left(1 - \frac{a}{\gamma(M)}\right)^c \quad (4)$$

$$a * b = \varphi^{-1}(\varphi(a) \cdot \varphi(b)) \quad (5)$$

$$\varphi(a) = -\lambda(M) \cdot \ln^\beta\left(1 - \frac{f}{\lambda(M)}\right) \quad (6)$$

$$\varphi^{-1}(a) = \lambda(M) \cdot \left[1 - \exp\left(\frac{-f}{\lambda(M)}\right)^{1/\beta}\right] \quad (7)$$

where we use $\oplus$ as PLIP addition, $\ominus$ as PLIP subtraction, $\otimes$ as PLIP multiplication by a scalar, and * as PLIP multiplication of two images. Also, a and b are any grey tone pixel values, c is a constant, M is the maximum value of the range, and $\beta$ is a constant. $\gamma(M)$, $k(M)$, and $\lambda(M)$ are all arbitrary functions. We use the linear case, such that they are functions of the type $\gamma(M)=AM+B$, where A and B are integers, however any arbitrary function will work. In general, a and b correspond to the same pixel in two different images that are being added, subtracted, or multiplied. The best values of A and B can be determined to be any combination such that $\gamma(M)$, $k(M)$, and $\lambda(M)=1026$ and the best value of $\beta$ was determined to be $\beta=2$.

Contrast Measure

Many enhancement techniques are based on enhancing the contrast of an image. There have been many differing definitions of an adequate measure of performance based on contrast. Gordon and Rangayan used local contrast defined by the mean gray values in two rectangular windows centered on a current pixel. Begchladi and Negrate defined an improved version of the aforementioned measure by basing their method on local edge information of the image. In the past, attempts at statistical measures of gray level distribution of local contrast enhancement such as those based on mean, variance, or entropy have not been particularly useful or meaningful. A number of images, which show an obvious contrast improvement, showed no consistency, as a class, when using these statistical measurements. Morrow introduced a measure based on the contrast histogram, which has a much greater consistency than statistical measures (see Sos Agaian, Blair Silver, and Karen Panetta, 2007, March), "Transform Coefficient Histogram Based Image Enhancement Algorithms Using Contrast Entropy," IEEE Trans. Image Processing, 16(3) pp. 751-758 (2007)). Measures of enhancement based on the human visual system have been previously proposed. Algorithms based on the human visual system are fundamental in computer vision. Two definitions of contrast measure have traditionally been used for simple patterns: Michelson for periodic patterns like sinusoidal gratings and Weber for large uniform luminance backgrounds with small test targets. However, these measures are not effective when applied to more difficult scenarios, such as images with non-uniform lighting or shadows. The first practical use of a Weber's law based contrast measure, the AWC or contrast measure was developed by Agaian (see Sos S. Agaian, "Visual Morphology," Proceedings of SPIE, Nonlinear Image Processing X, San Jose, Calif., vol. 3646, pp. 139-150, March 1999).

This contrast measure was later developed into the EME, or measure of enhancement, and the EMEE, or measure of enhancement by entropy. Finally, the Michelson Contrast Law was included to further improve the measures. These were called the AME and AMEE. These are summarized in Table I, and are calculated by dividing an image into $k_1 \times k_2$ blocks, calculated the measure for each block, and averaging the results as shown in the formula definitions.

TABLE I

Summary of Quantitative Enhancement Measures with Laws, Definitions, and References

| Name | Law | Formula Definition |
|---|---|---|
| EME | Weber's Law, Fechner's Law | $EME_{k_1 k_2}(\Phi) = \frac{1}{k_1 k_2} \sum_{i=1}^{k_2} \sum_{k=1}^{k_1} 20 \log \frac{I^w_{max;x;k,l}(\Phi)}{I^w_{min;k,l}(\Phi)}$ |
| EMEE | Weber's Law, Entropy | $EMEE_{k_1 k_2}(\Phi) = \frac{1}{k_1 k_2} \sum_{i=1}^{k_2} \sum_{k=1}^{k_1} \frac{I^w_{max;k,l}}{I^w_{min;k,l}} \log \frac{I^w_{max;x;k,l}(\Phi)}{I^w_{min;k,l}(\Phi)}$ |
| AME | Michelson Law, Fechner's Law | $AME_{k_1 k_2}(\Phi) = \frac{1}{k_1 k_2} \sum_{i=1}^{k_1} \sum_{j=1}^{k_2} 20 \ln \frac{I^w_{max;k,l} - I^w_{min;k,l}}{I^w_{max;k,l} + I^w_{min;k,l}}$ |
| AMEE | Michelson Law, Entropy | $AMEE_{k_1 k_2}(\Phi) = \frac{1}{k_1 k_2} \sum_{i=1}^{k_1} \sum_{j=1}^{k_2} \frac{I^w_{max;k,l} - I^w_{min;k,l}}{I^w_{max;k,l} + I^w_{min;k,l}} \ln\left(\frac{I^w_{max;k,l} - I^w_{min;k,l}}{I^w_{max;k,l} + I^w_{min;k,l}}\right)$ |

In accordance with exemplary embodiments of the invention, PLIP operator primitives are used to improve image processing for a more accurate processing of the contrast information, as PLIP subtraction has been shown to be consistent with Weber's Contrast Law. With these modifications, the inventive Logarithmic AME and Logarithmic AMEE measures are disclosed, which are better able to assess images and thus more accurately select parameters.

$$\log AME_{k_1 k_2}(\Phi) = \frac{1}{k_1 k_2} \otimes \sum_{i=1}^{k_1} \sum_{j=1}^{k_2} \frac{1}{20} \otimes \ln\left(\frac{I^w_{max:k,l} \ominus I^w_{min:k,l}}{I^w_{max:k,l} \oplus I^w_{min:k,l}}\right)$$

$$\log AMEE_{k_1 k_2}(\Phi) = $$

$$\frac{1}{k_1 k_2} \otimes \sum_{i=1}^{k_1} \sum_{j=1}^{k_2} \frac{I^w_{max:k,l} \ominus I^w_{min:k,l}}{I^w_{max:k,l} \oplus I^w_{min:k,l}} \otimes \ln\left(\frac{I^w_{max:k,l} \ominus I^w_{min:k,l}}{I^w_{max:k,l} \oplus I^w_{min:k,l}}\right)$$

where $\oplus$ as PLIP addition, $\ominus$ as PLIP difference and $\otimes$ as PLIP multiplication by a scalar, as set below in PLIP Arithmetic and disclosed in "Human Visual System-Based Image Enhancement and Logarithmic Contrast Measure Panetta, K. A., Wharton, E. J., and Agaian, S. S., Tufts Univ., Medford; *Systems, Man, and Cybernetics, Part B: Cybernetics, IEEE Transactions on*, Publication Date: February 2008, Volume: 38, Issue: 1, page(s): 174-188. To use the measures for selection of parameters, the algorithm is first run for all practical values of the parameters. The measure is calculated for each output image, and this data is organized into a graph as measure versus parameters. Finally, the best parameters are located at the local extrema.

Figure 10:
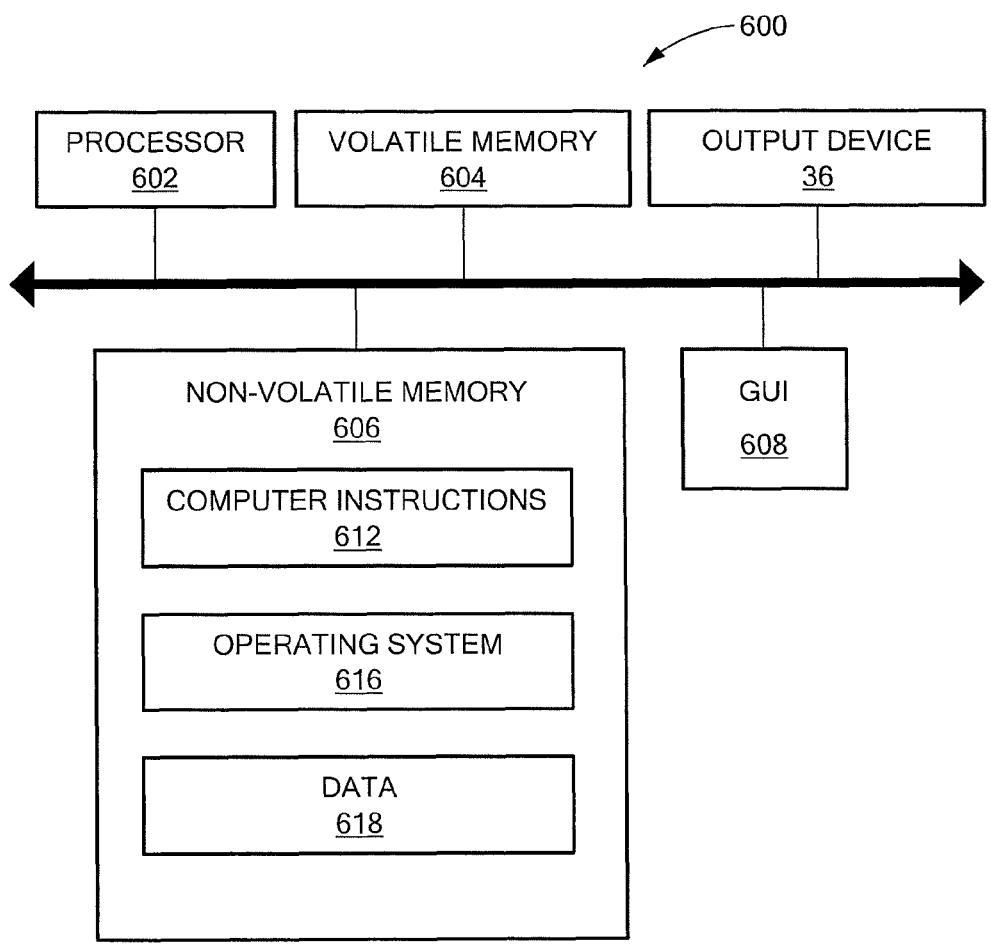
FIG. 10 shows an exemplary computer on which image processing in accordance with the present invention can be implemented.

It is understood that exemplary embodiments of the invention described herein can be implemented in a variety of hardware, software, and hardware/software combinations. In one embodiment, the processing for the system of FIG. 1, for example, can be implemented on a computer. FIG. 10 shows an exemplary computer including a processor 602, a volatile memory 604, a non-volatile memory 606 (e.g., hard disk), a graphical user interface (GUI) 608 (e.g., a mouse, a keyboard, a display, for example). The non-volatile memory 606 stores computer instructions 612, an operating system 616 and data 618. In one example, the computer instructions 612 are executed by the processor 602 out of volatile memory 604 to perform all or part of the exemplary processing.

The processing described herein is not limited to use with the hardware and software of FIG. 10; they may find applicability in any computing or processing environment and with any type of machine or set of machines that is capable of running a computer program. Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processes and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform processing. Processing may also be implemented as a machine-readable storage medium, configured with a computer program, where upon execution, instructions in the computer program cause the computer to operate.

The processing associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)). Elements of different embodiments described herein may be combined to form other embodiments not specifically set forth above. Other embodiments not specifically described herein are also within the scope of the following claims.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A computer-implemented method, comprising:
    performing visual sub-band decomposition of an image using human visual system characteristics to generate a plurality of sub-band decomposed images based on a minimum difference between pixel intensities in the image for the human visual system to register a difference;
    independently processing the plurality of sub-band decomposed images with at least one application on a computer; and
    fusing the independently processed sub-band decomposed images to reconstruct an output image.

2. The method according to claim 1, wherein the plurality of sub-band decomposed images include variable level sub-band decomposition.

3. The method according to claim 1, wherein the application includes image enhancement and/or edge detection.

4. The method according to claim 1, further including performing decomposition of the image not including human visual system characteristics for inclusion in the fusing step.

5. The method according to claim 1, wherein the fusing is performed to optimize a particular application.

6. The method according to claim 1, further including transmitting, analyzing and displaying the sub-band decomposed images separately.

7. The method according to claim 1, further including performing on the image one or more of edge detection, compression, filtering, enhancement, edge enhancement, recognition, denoising, restoration, digital forensic, security, and information hiding, fault detection, static hazard free circuit design, a method for simplifying a plurality of gates in circuits, image interpolation and image resizing.

8. The method according to claim 1, further including human visual system based multi-histogram equalization.

9. An article, comprising:
    a non-transitory machine-readable medium that stores executable instructions to enable a computer perform the steps of:
    performing visual sub-band decomposition of an image using human visual system characteristics to generate a plurality of sub-band decomposed images based on a minimum difference between pixel intensities in the image for the human visual system to register a difference;
    independently processing the plurality of sub-band decomposed images with at least one application on a computer; and
    fusing the independently processed sub-band decomposed images to reconstruct an output image.

10. The article according to claim 9 wherein the plurality of sub-band decomposed images include variable level sub-band decomposition.

11. The article according to claim 9, wherein the application includes image enhancement and/or edge detection.

12. The article according to claim 9, wherein the fusing is performed to optimize a particular application.

13. The article according to claim 9, further including transmitting, analyzing and displaying the sub-band decomposed images separately.

14. The article according to claim 9, further including performing on the image one or more of edge detection, compression, filtering, enhancement, edge enhancement, recognition, denoising, restoration, digital forensic, security, and information hiding, fault detection, static hazard free circuit design, a method for simplifying a plurality of gates in circuits, image interpolation and image resizing.

15. A system, comprising:
    a first decomposition module to decompose an image into a first sub-band based on human visual system characteristics;
    a second decomposition module to decompose the image into a second sub-band based on human visual system characteristics based on a minimum difference between pixel intensities in the image for the human visual system to register a difference;
    a third decomposition module to decompose the image into a third sub-band based on human visual system characteristics;
    a processing module to process the decomposed images from the first, second, and third sub-band modules; and
    a fusion module to fuse the processed decomposed images from the processing module.

16. The system according to claim 15, wherein the plurality of sub-band decomposed images include variable level sub-band decomposition.

17. The system according to claim 15, wherein the application includes image enhancement and/or edge detection.

18. The system according to claim 15, further including performing decomposition of the image not including human visual system characteristics for inclusion in the fusing step.

19. The system according to claim 15, wherein the fusing is performed to optimize a particular application.

* * * * *